No. 853,313. PATENTED MAY 14, 1907.
W. C. MYERS.
FRUIT CLIPPER.
APPLICATION FILED MAR. 3, 1906.
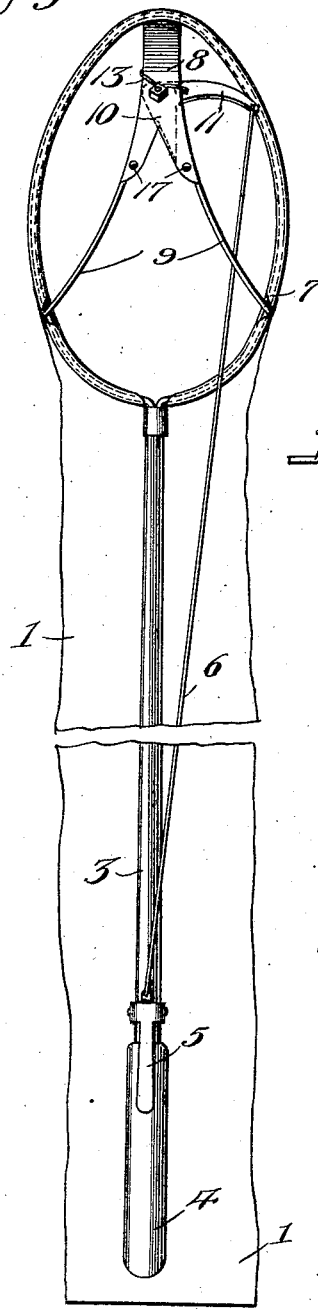
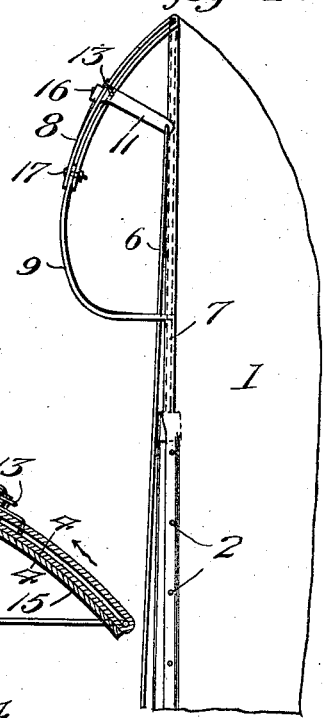
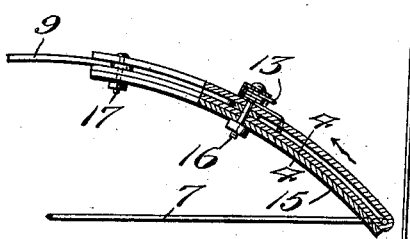
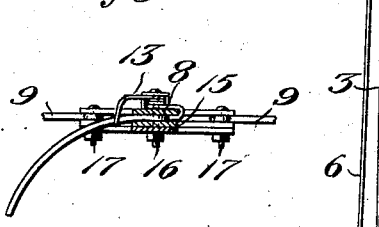
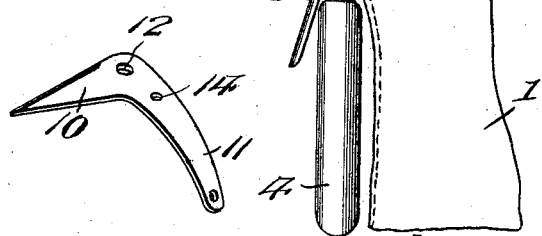
WITNESSES:
Frank B. Hoffman
P. M. Smith
INVENTOR
William C. Myers
By Victor J. Evans
Attorney

UNITED STATES PATENT OFFICE.

WILLIAM C. MYERS, OF SPRINGFIELD, OREGON.

FRUIT-CLIPPER.

No. 853,313.  Specification of Letters Patent.  Patented May 14, 1907.

Application filed March 3, 1906. Serial No. 304,010.

*To all whom it may concern:*

Be it known that I, WILLIAM C. MYERS, a citizen of the United States, residing at Springfield, in the county of Lane and State of Oregon, have invented new and useful Improvements in Fruit-Clippers, of which the following is a specification.

This invention relates to fruit clippers and the object of the invention is to provide a hand-operated device of the character referred to by means of which the fruit may be clipped so as to leave a stem of any desired length and deliver the fruit into the hand of the operator without danger or bruising or injuring the same.

A further object of the invention is to make the cutting apparatus adjustable so as to properly gage the length of stem to be allowed to remain on the fruit after such stem has been severed.

With the above and other objects in view, the nature of which will more fully appear as the description proceeds, the invention consists in the novel construction, combination and arrangement of parts, hereinafter more fully described, illustrated and claimed.

In the accompanying drawings, Figure 1 is a front elevation of a fruit clipper embodying the present invention. Fig. 2 is a side elevation of the same. Fig. 3 is an enlarged longitudinal section through the cutting or clipping mechanism. Fig. 4 is a transverse section through the same on the line 4—4 of Fig. 3. Fig. 5 is a detail perspective view of the cutter *per se*.

Referring to the drawings, 1 designates a flexible chute consisting of an elongated bag or sack of canvas or other textile material which is secured along one side, as shown at 2, to a pole or staff 3 of any desired length, the same being provided at one end with a hand lever 5 to which is connected one end of an operating connection 6 by means of which the cutter or clipper of the invention is operated for severing the stem of the fruit.

At its upper end the pole 3 is provided with an elliptical stretcher frame 7 to which the upper end or mouth of the bag is secured in any convenient manner, as clearly shown in Figs. 1 and 2, the said upper end of the bag being thus stretched open to receive the fruit which, when severed, drops downward through the flexible chute 1 into the operator's hand held at the lower end of the bag to catch the same.

Extending from the top of the stretcher frame 7 downward is a hollow crotch or fork 8 consisting of two arcuate plates arranged in parallel or concentric relation to each other, as shown in Figs. 2, 3 and 4, so as to permit a suitable cutter to operate between the same.

The lower end portion of the crotch 8 is connected to the lower portion of the stretcher frame by means of stays or arms 9 which diverge from the arms or branches of the crotch downward to the point where they connect with the stretcher frame. The arcuate crotch projects outward from the front of the stretcher frame in the manner illustrated in Fig. 2 so that the stem of the fruit may be guided into the crotch by means of the stays or arms 9 and the inwardly converging brancher of the crotch or fork until said stem rests in the inner end of the crotch. The cutter 10 is made in the form of an elbow, being provided with an angularly disposed lever arm 11, said cutter being pivotally mounted at its elbow at the point 12 between the inner and outer members of the crotch, as shown in Fig. 3. The lever arm 11 has the upper end of the operating connection 6 attached thereto so that as the hand lever 5 is vibrated, the cutter is also vibrated, causing the blade portion thereof to operate across the V-shaped throat of the crotch in which the stem of the fruit lies, thereby severing said stem.

The cutter is returned to its initial position by means of the retracting spring 13 which is coiled around the pivot of the cutter, and has one arm connected to the lever arm of the cutter at the point 14, while the other arm of the spring is connected to a fixed point on the crotch 8, as shown in Fig. 1, the tension of said spring being exerted to hold the blade of the cutter off to one side of the crotch.

The inner member or plate of the crotch is of laminated and sectional construction, being composed of a plurality of sections 15 as illustrated in Figs. 3 and 4, the sections being connected detachably by means of the bolts 16 and 17, the bolt 16 forming the pivot of the cutter and the bolts 17 forming the means whereby the branches of the crotch are connected with the stays or arms 9. By varying the number of sections 15 or, in other words, by removing some of the sections or applying additional sections, the distance between the body of the fruit and the point at which the stem is severed may be increased or diminished, thereby regulating the length of stem to be left attached to the fruit. The cutter 10 is curved to correspond with the curvature of the inner and outer members of the crotch so as to operate freely between the same.

By reason of the fact that the arcuate hollow crotch projects in advance of the stretcher frame and mouth of the bag or sack which is to receive the fruit, the upwardly converging arms or stays may be positioned on opposite sides of the stem and thereby act as guides for directing the stem into the crotch in position to be severed, while the fruit itself rests in the elliptical stretcher frame so that the moment the stem is severed, the fruit drops into the mouth of the bag or sack and passes downward to the operator's hand held at the lower end of such bag or sack.

I claim:

The herein described fruit clipper comprising a pole, a stretcher frame connected to one end thereof, a flexible bag or sack having one end connected with the stretcher frame, an overhanging hollow arcuate crotch extending from the upper portion of the stretcher frame downward, downwardly diverging stays or arms connecting the branches of said crotch with the lower portion of the stretcher frame, and a cutter mounted and operating between the front and back plates of the hollow crotch, the cutting edges of said cutter being disposed downwardly, and one of the crotch plates being of sectional construction, the sections thereof being detachably connected, substantially as and for the purpose described.

In testimony whereof, I affix my signature in presence of two witnesses.

WILLIAM C. MYERS.

Witnesses:
P. R. SNIDER,
H. E. WALKER.